(12) United States Patent
Chang

(10) Patent No.: US 7,092,169 B1
(45) Date of Patent: Aug. 15, 2006

(54) ZOOM LENS SYSTEM

(75) Inventor: Yu-Min Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/233,230

(22) Filed: Sep. 22, 2005

(30) Foreign Application Priority Data

Apr. 26, 2005 (TW) ............................... 94113227 A

(51) Int. Cl.
*G02B 15/14* (2006.01)

(52) U.S. Cl. .................. 359/683; 359/684; 359/685; 359/686; 359/714; 359/757; 359/763; 359/764

(58) Field of Classification Search ............ 359/676, 359/683–686, 714, 756, 757, 763, 764
See application file for complete search history.

(56) References Cited

U.S. PATENT DOCUMENTS 5,185,676 A 2/1993 Arimoto 6,061,186 A 5/2000 Nishio
6,718,132 B1 * 4/2004 Nishina ...................... 359/684

* cited by examiner

*Primary Examiner*—Evelyn A. Lester
(74) *Attorney, Agent, or Firm*—Madson & Austin

(57) ABSTRACT

A zoom lens system, in sequence from an object side to an image side, includes a first lens group having positive refractive power and fixed for gathering incoming light; a second lens group having negative refractive power for changing a focal length of the zoom lens system; a third lens group having positive refractive power and made stationary; a fourth lens group having positive refractive power and movable for compensating for a fluctuation of an image plane position; and a fifth lens group having positive refractive power and movable for focusing purpose. During zooming from a wide-angle end to a telephoto end, the second and fourth lens groups are moved independently toward the third lens group in such a manner that spacing between the first lens group and the second lens group increases and spacing between the third lens group and the fourth lens group decreases.

19 Claims, 11 Drawing Sheets

ZOOM LENS SYSTEM

BACKGROUND OF THE INVENTION

1. Field of the Invention

The present invention relates to a zoom lens system, and more particularly to a compact zoom lens system having a high variable magnification ratio and a high resolution.

2. Description of the Prior Art

In order to effect downsizing and to improve the image quality and function of video cameras, downsizing of high performance and high function zoom lenses and image pick up devices is required. Consequently, a high zoom ratio obtained by reducing the wide angle focal length of the system and extending the telescopic focal length of the system, and a high image quality, attained by compensating aberrations, are necessitated. On the other hand, a lens system manufactured at low cost while maintaining high performance is called for in order to maintain economic competitiveness. Consequently, a zoom lens capable of providing a wide view angle, a high zoom ratio, and a high resolution with a smaller F number of lenses is needed.

A conventional zoom lens disclosed in U.S. Pat. No. 5,185,678 comprises five lens units of positive, negative, positive, positive, and negative refractive powers in sequence from the object side to the image side. Each lens unit comprises a single lens element or cemented lens. The total number of lens elements of the conventional zoom lens is about 16 to 20. Another conventional zoom lens is disclosed in U.S. Pat. No. 6,061,186, also comprising five lens units of positive, negative, positive, positive, and negative refractive powers. The number of lens elements of the conventional zoom lens is about 17 to 19. It is clear that number of lens elements of above-mentioned conventional lens units is relatively large, the total length of the lens system is great, and the production cost is high.

Hence, it is desired to have a zoom lens that overcomes the above-mentioned drawbacks.

SUMMARY OF THE INVENTION

A primary objective of the present invention is to provide a zoom lens system that has a high variable magnification ratio and a compact structure composed of less constituent lens elements, and having excellent optical performance, high zoom ratio and high resolution.

To achieve the foregoing objective, a zoom lens system in accordance with the present invention, in sequence from an object side to an image side, comprises a first lens group having positive refractive power and fixed for gathering incoming light; a second lens group having negative refractive power for changing a focal length of the zoom lens system; a third lens group having positive refractive power and made stationary; a fourth lens group having positive refractive power and movable for compensating for a fluctuation of an image plane position; and a fifth lens group having positive refractive power and movable for focusing purpose. During zooming from a wide-angle end to a telephoto end, the second and fourth lens groups are moved independently toward the third lens group in such a manner that spacing between the first lens group and the second lens group increases and spacing between the third lens group and the fourth lens group decreases.

To achieve the foregoing objective, the zoom lens system satisfies the following equation:

$$0.75 \leq \frac{2 \cdot f_W \cdot f_T}{Y \cdot L} \leq 1.35 \quad \text{(a-1)}$$

In equation (a-1), $f_W$ and $f_T$ are focal lengths of wide-angle end and telephoto end of the zoom lens system, respectively. Maximum diagonal length of the image plane is denoted by Y. Total length of the zoom lens system is denoted by L.

To achieve the foregoing objective, in the zoom lens system in accordance with the present invention, relationship between fourth lens group and the second lens group satisfies the following equation:

$$2.3 \leq \left|\frac{f_4}{f_2}\right| \leq 3.9 \quad \text{(a-2)}$$

In equation (a-2), $f_2$ and $f_4$ are focal lengths of the second lens group 2 and the fourth lens group 4, respectively.

To achieve the foregoing objective, in the zoom lens system in accordance with the present invention, the second lens group comprises at least one aspheric surface.

To achieve the foregoing objective, in the zoom lens system in accordance with the present invention, the fourth lens group comprises at least one aspheric surface.

To achieve the foregoing objective, in the zoom lens system in accordance with the present invention, during focusing, the fifth lens group is moved toward the object side, i.e. toward the fourth lens group, thereby decreasing spacing between the fifth lens group and the fourth lens group.

To achieve the foregoing objective, in the zoom lens system in accordance with the present invention, the aspheric surfaces satisfy the following equation:

$$D = \frac{C \cdot H^2}{1 + \sqrt{1 - (1+K) \cdot C^2 \cdot H^2}} + \quad \text{(a-3)}$$
$$E_4 \cdot H^4 + E_6 \cdot H^6 + E_8 \cdot H^8 + E_{10} \cdot H^{10}$$

In equation (a-3), D represents a sag amount which is defined as a distance from a point on the aspheric surface to a plane tangential to the aspheric surface at the optical axis; K represents a conic constant; C=1/R, where R is the paraxial radius of curvature; and $E_4$, $E_6$, $E_8$, and $E_{10}$ are aspheric coefficients.

Contrary to the prior art, the zoom lens system according to the present invention comprises five lens groups with the first and the third lens groups made stationary. The second and fourth lens groups are moved for focusing purpose and the fifth lens group 5 is moved for focusing purpose. As a result, a good imaging quality is obtained. Therefore, the zoom lens system of the present invention has a high variable magnification ratio despite, a high zoom ratio and a high resolution while only has 12 constituent lens elements. The zoom lens system of the present invention also has good correction of aberrations and has excellent optical performance and is compact, relatively light and low cost.

Other objects, advantages, and novel features of the invention will become more apparent from the following detailed description of a preferred embodiment when taken in conjunction with the accompanying drawings, in which:

DETAILED DESCRIPTION OF THE PREFERRED EMBODIMENT

Reference will now be made in detail to the following preferred embodiment of the present invention.

Figure 1:
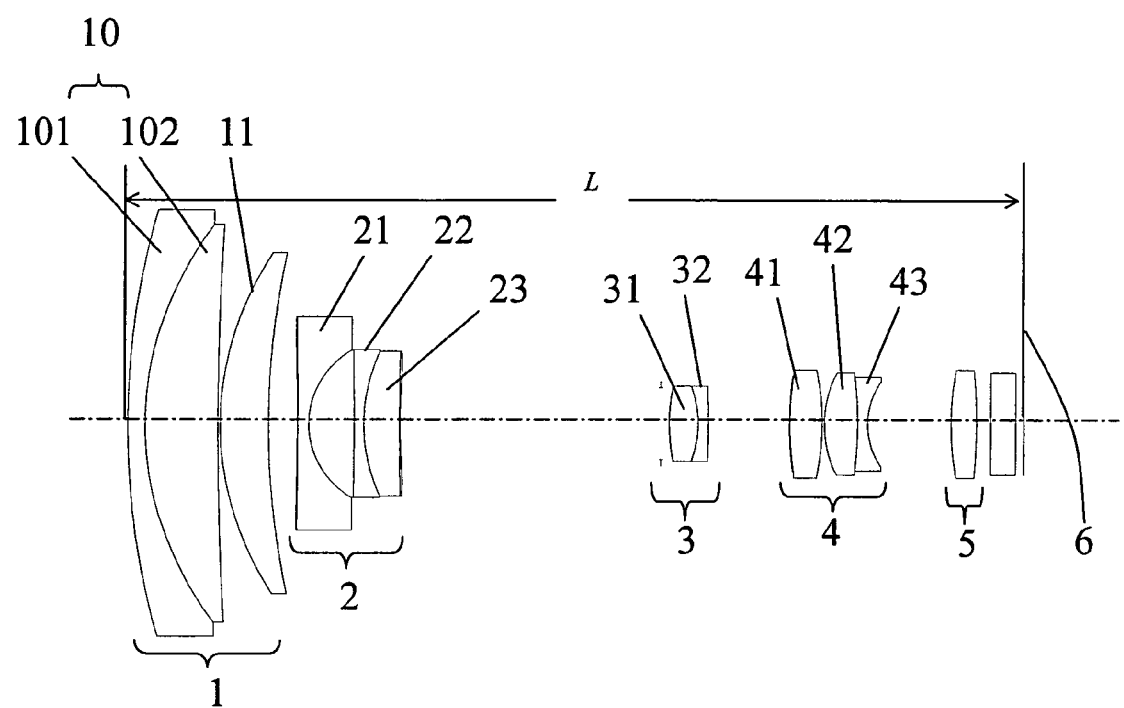
FIG. 1 is a schematic view illustrating a zoom lens system constructed in accordance with the present invention.
Figure 2A:
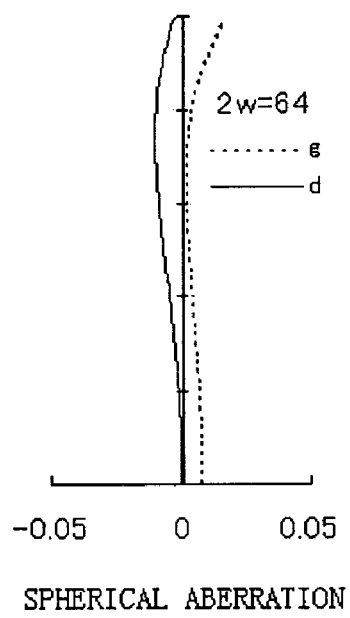
FIGS. 2A–2D are graphic representations of the aberrations of the numerical example 1 of the invention in the wide-angle end.
Figure 2B:
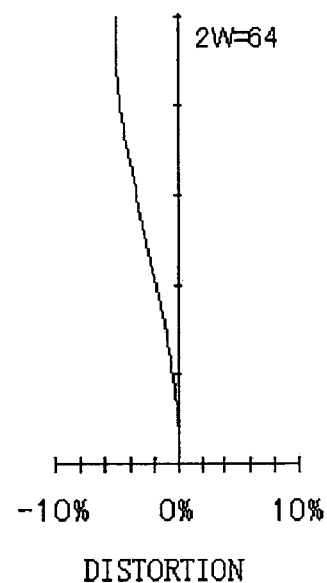
Figure 2C:
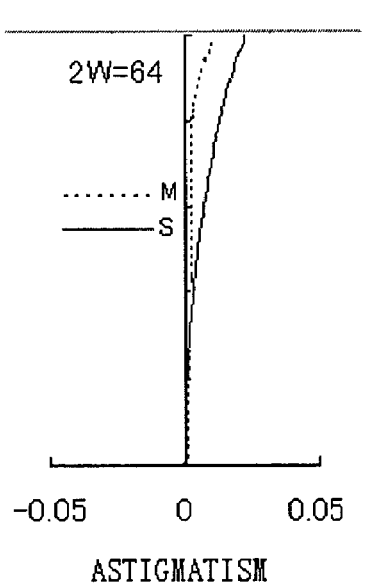
Figure 2D:
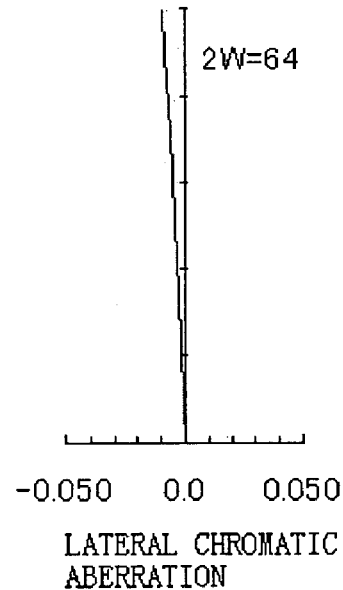
Figure 3A:
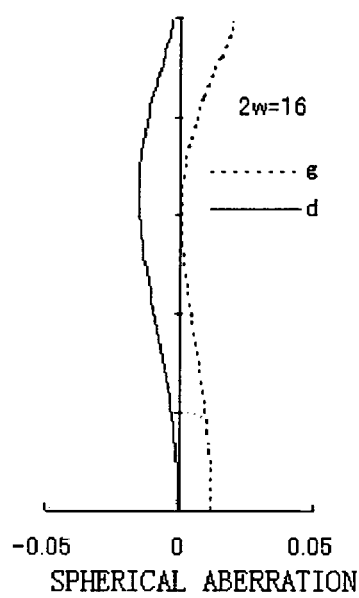
FIGS. 3A–3D are graphic representations of the aberrations of the numerical example 1 of the invention in the middle position.
Figure 3B:
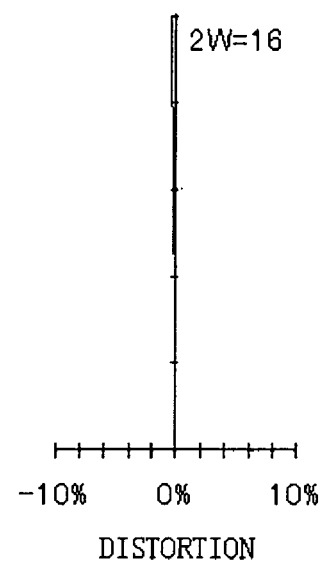
Figure 3C:
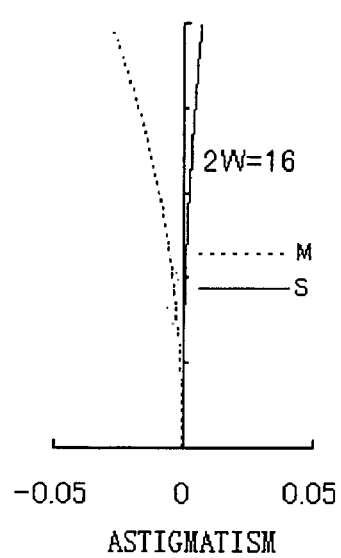
Figure 3D:
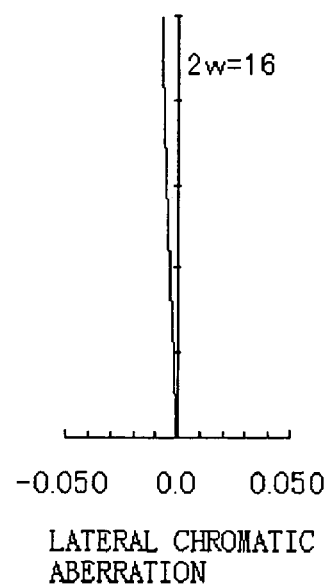
Figure 4A:
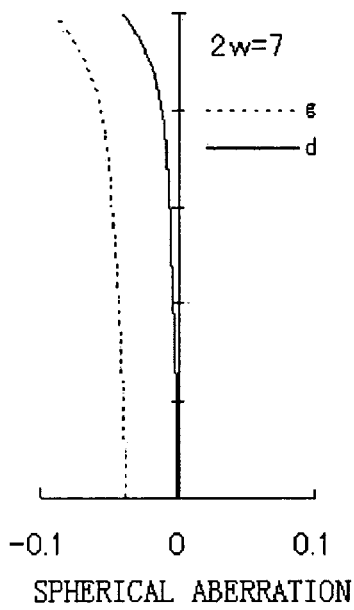
FIGS. 4A–4D are graphic representations of the aberrations of the numerical example 1 of the invention in the telephoto end.
Figure 4B:
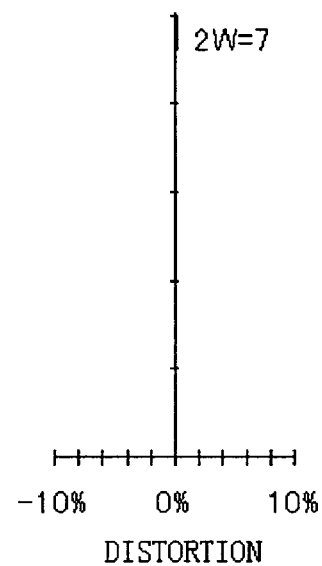
Figure 4C:
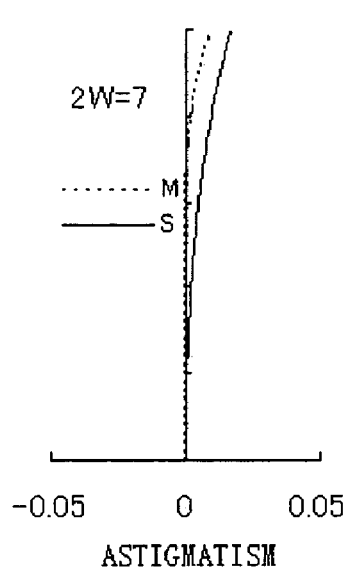
Figure 4D:
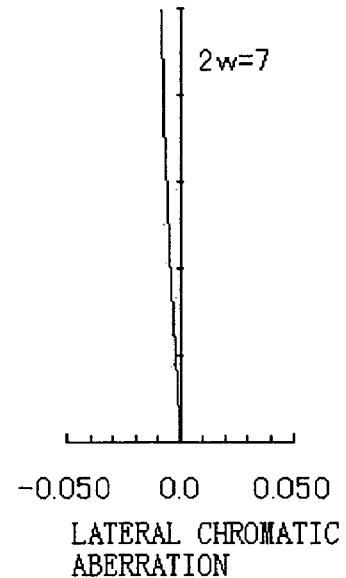
Figure 5A:
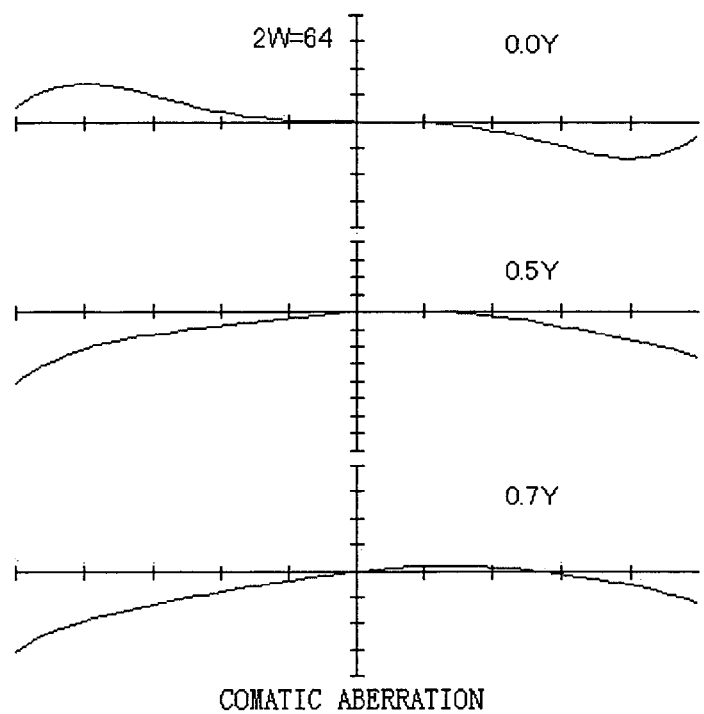
FIGS. 5A–5C are graphic representations of the comatic aberrations of the numerical example 1 of the invention in the wide-angle end, middle position, and the telephoto end, respectively.
Figure 5B:
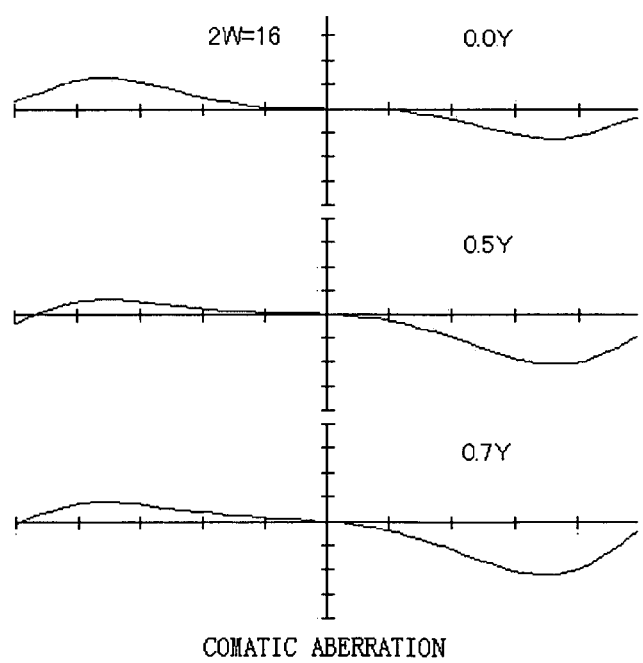
Figure 5C:
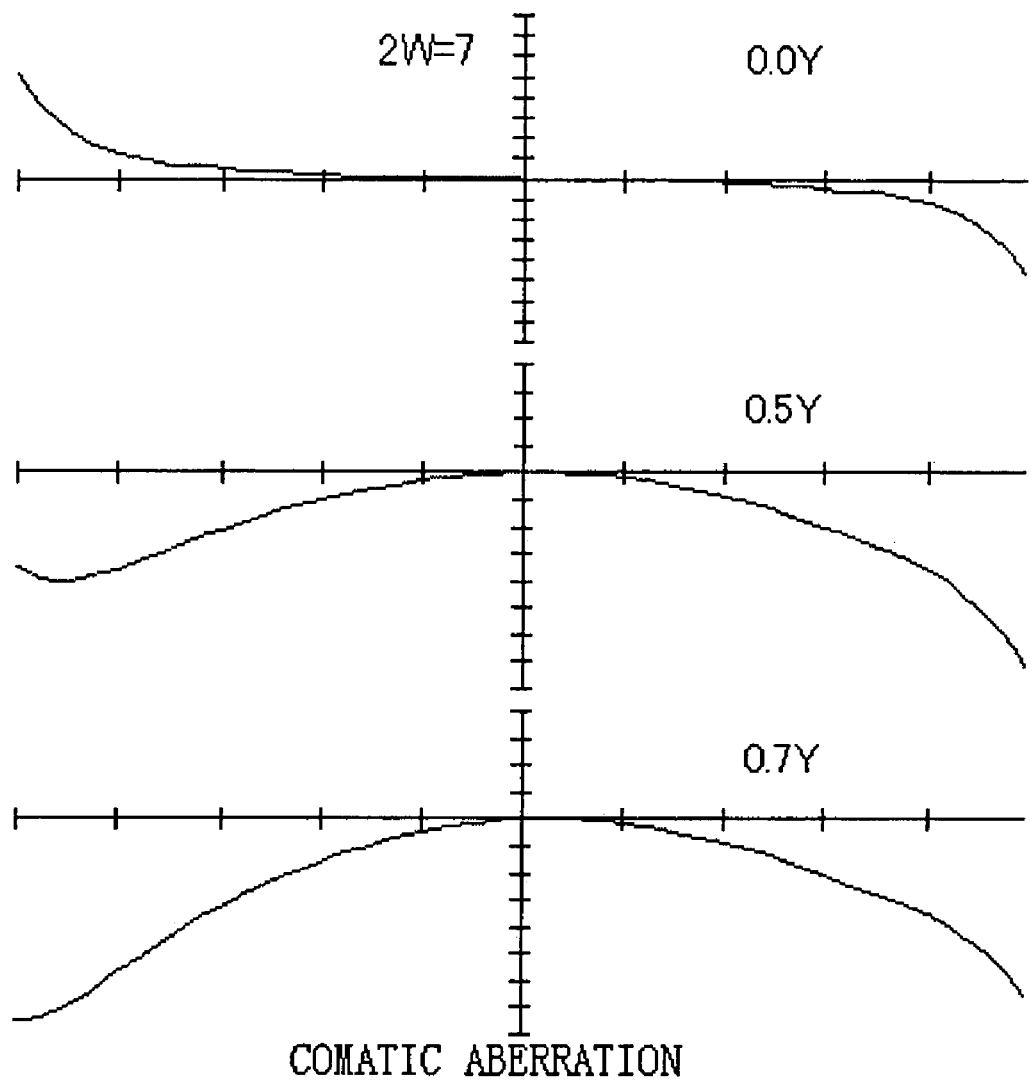
Figure 6A:
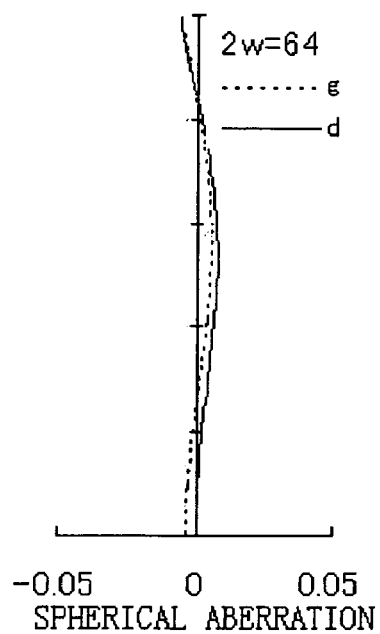
FIGS. 6A–6D are graphic representations of the aberrations of the numerical example 2 of the invention in the wide-angle end.
Figure 6B:
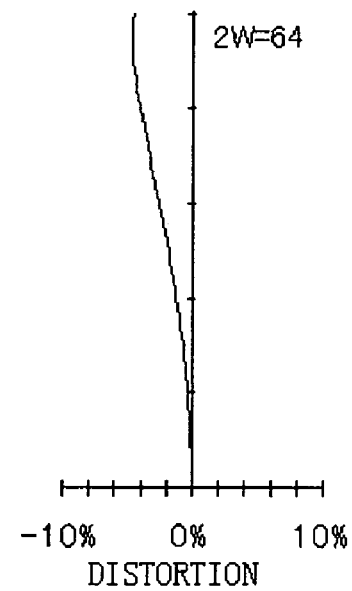
Figure 6C:
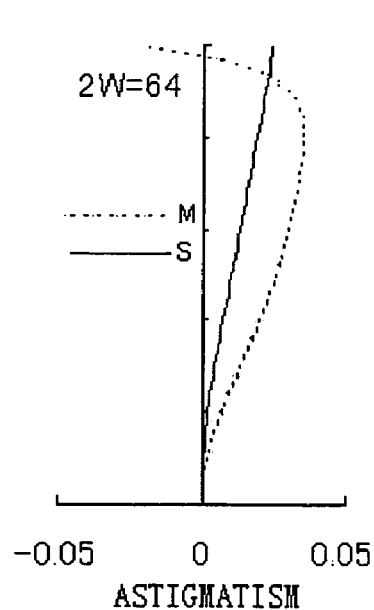
Figure 6D:
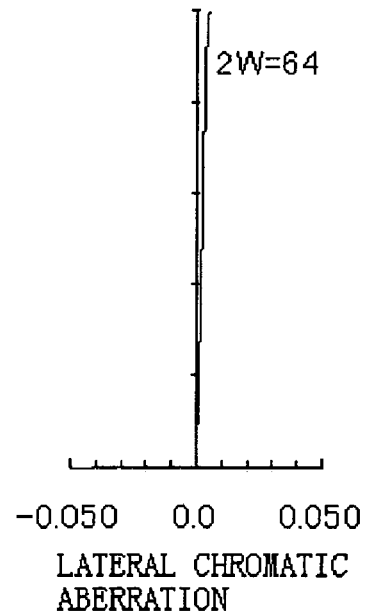
Figure 7A:
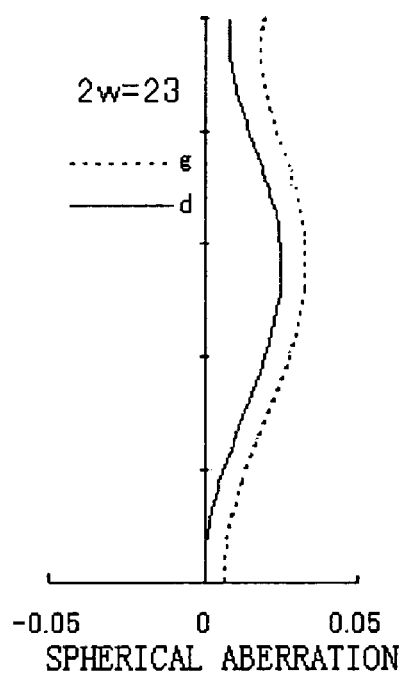
FIGS. 7A–7D are graphic representations of the aberrations of the numerical example 2 of the invention in the middle position.
Figure 7B:
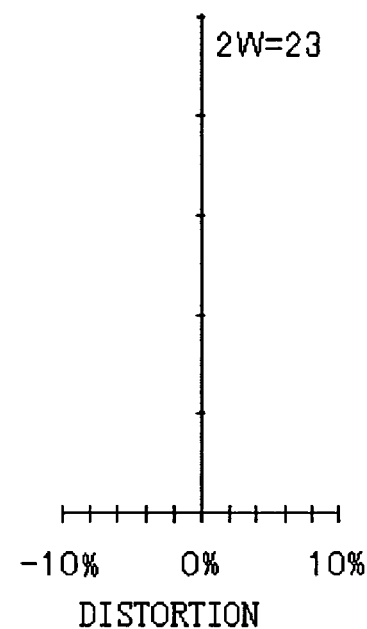
Figure 7C:
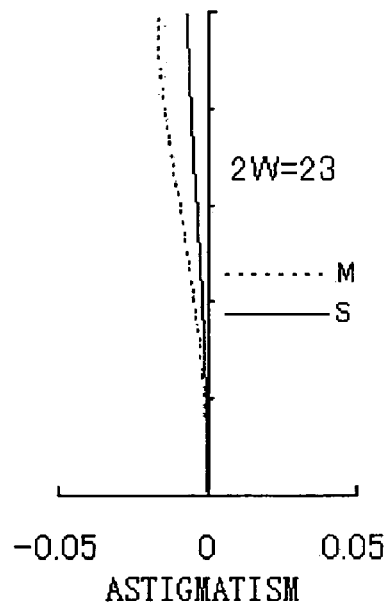
Figure 7D:
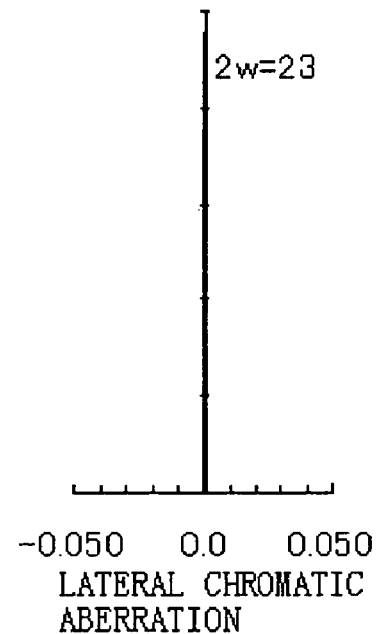
Figure 8A:
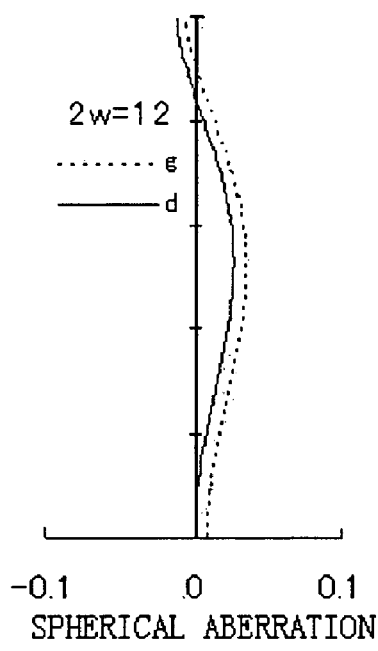
FIGS. 8A–8D are graphic representations of the aberrations of the numerical example 2 of the invention in the telephoto end.
Figure 8B:
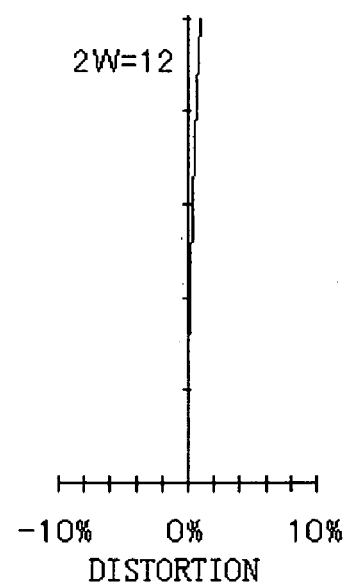
Figure 8C:
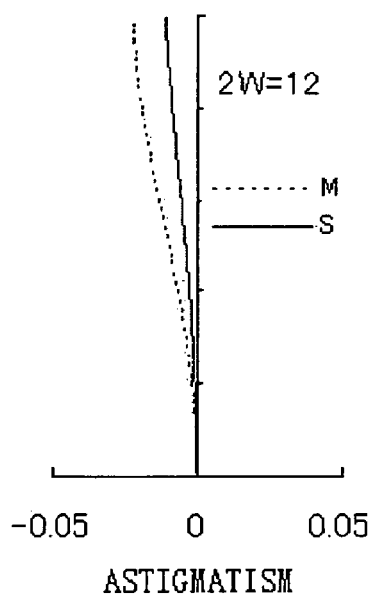
Figure 8D:
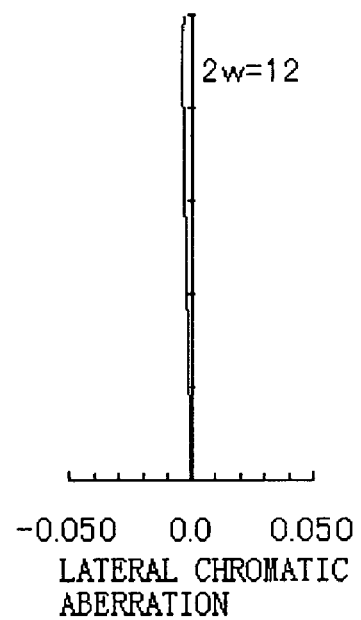
Figure 9A:
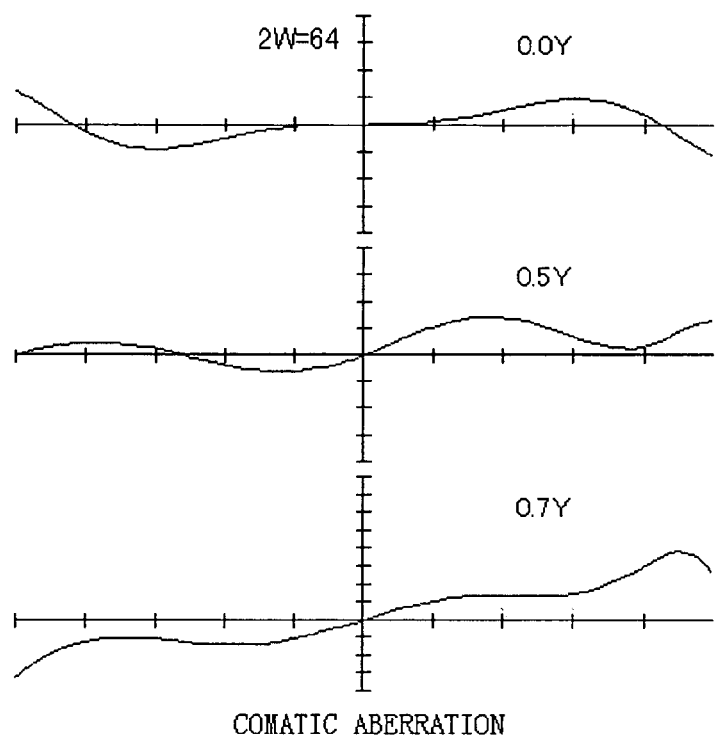
FIGS. 9A–9C are graphic representations of the comatic aberrations of the numerical example 2 of the invention in the wide-angle end, middle position, and the telephoto end, respectively.
Figure 9B:
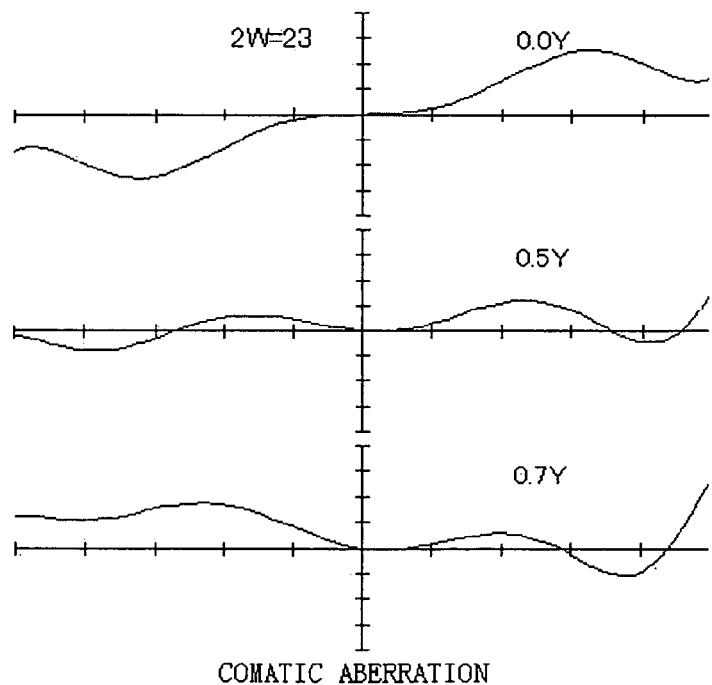
Figure 9C:
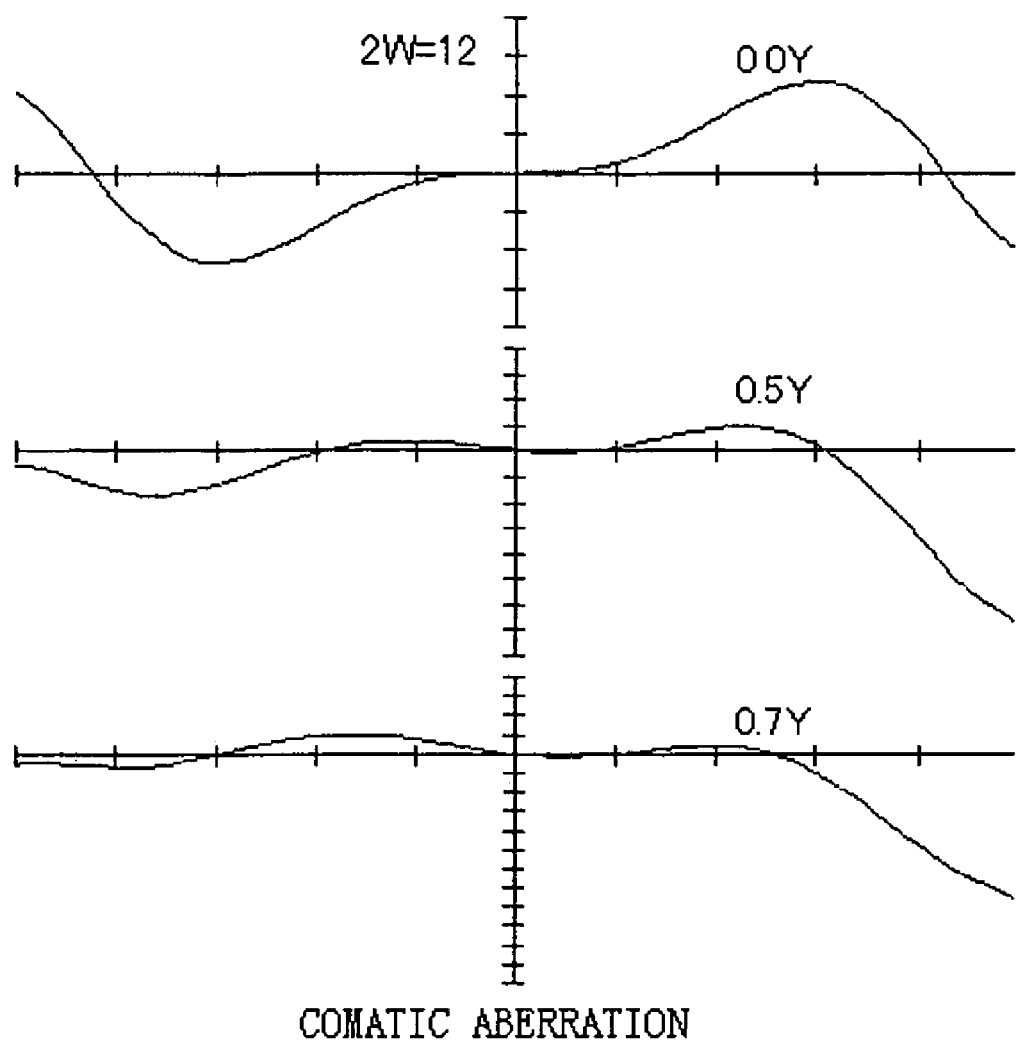

Referring to FIG. 1, a zoom lens system in accordance with a preferred embodiment of the present invention comprises, in sequence from an object side of the zoom lens system, a first lens group 1 having positive refractive power, a second lens group 2 having negative refractive power, a third lens group 3 having positive refractive power, a fourth lens group 4 having positive refractive power and a fifth lens group 5 having positive refractive power.

The first lens group 1 comprises a cemented lens 10 and a single lens 11. The cemented lens 10 is fixed in the front of the zoom lens system and comprises a first lens element 101 and a second lens element 102. The first lens unit 1 is provided for gathering incoming light and is made of plastic or glass. In the preferred embodiment, the cemented lens 10 and the single lens 1 both have a convex surface facing the object side and an opposite surface concave toward the object side. This allows the zoom lens system to a wide-angle of view in the wide-angle state.

The second lens group 2 is provided for changing a focal length of the zoom lens system of the present invention and comprises a first, negative lens 21, a second, negative lens 22, and a third, positive lens 23. The second lens group 2 may be made of plastic or glass. At least one of the lenses 21, 22, 23 of the second lens group 2 has an aspheric surface. As a result, excellent correction is made for various aberrations especially spherical aberration, coma astigmatism. Herewith a good imaging quality is obtained.

The third lens group 3 is made stationary in the zoom lens system and comprises a positive lens 31 having a bi-convex form and a negative lens 32 having a plano-concave form. The third lens group 3 comprises a diaphragm on the object side thereof for limiting light passing through the zoom lens system.

The fourth lens group 4 compensates for a fluctuation of an image plane position with zooming, thereby maintaining the image plane position unchanged. The fourth lens group 4 comprises two positive lenses 41 and 42 and a negative lens 43. In the fourth lens group 4, it is preferable that at least one of the lenses 41, 42, 43 has an aspheric surface. As a result, the flatness of the image plane 6 becomes better and a good imaging quality is obtained.

The fifth lens group 5 comprises a positive lens having a bi-convex shape. During focusing, the fifth lens group 5 is axially moved toward the object side, i.e. toward the fourth lens group 4, thereby decreasing the spacing between the fifth lens group 5 and the fourth lens group 4.

During zooming from the wide-angle end to the telephoto end, the second lens group 2 is axially moved toward the image side while the fourth lens group 4 is moved toward the object side. In other words, both the second lens group 2 and the fourth lens group 4 are axially moved toward the third lens group 3. As a result, spacing between the first lens group 1 and the second lens group 2 is increased while spacing between the third lens group 3 and the fourth lens group 4 is decreased. The fifth lens group 5 is separately moveable for focusing purpose.

The zoom lens system of the present invention, although comprising five lens groups, is made compact in structure, having less constituent lens elements. The zoom lens system is an inner-zooming system, which allows a camera to keep its flat shape for close-up shots. The zoom lens system preferably satisfies the following equation:

$$0.75 \leq \frac{2 \cdot f_W \cdot f_T}{Y \cdot L} \leq 1.35 \quad \text{(a-1)}$$

In equation (a-1), $f_w$ and $f_T$ are focal lengths of wide-angle end and telephoto end of the zoom lens system, respectively. The symbol Y denotes the maximum diagonal length of the image plane. Total length of the zoom lens system is denoted by L.

The relationship between fourth lens group 4 and the second lens group 2 satisfies the following equation:

$$2.3 \leq \left|\frac{f_4}{f_2}\right| \leq 3.9 \quad \text{(a-2)}$$

In equation (a-2), $f_2$ and $f_4$ are focal lengths of the second lens group 2 and the fourth lens group 4, respectively.

The second lens group 2 and the fourth lens group 4 each have at least one aspheric surface, and therefore, the zoom lens system has good correction of aberrations throughout the entire zooming range. If a spherical lens is employed, the zoom lens system has to provide an additional space for positioning a number of cemented lenses to correct aberration during zooming. The aspheric surfaces satisfy the following equation:

$$D = \frac{C \cdot H^2}{1+\sqrt{1-(1+K) \cdot C^2 \cdot H^2}} + \quad \text{(a-3)}$$
$$E_4 \cdot H^4 + E_6 \cdot H^6 + E_8 \cdot H^8 + E_{10} \cdot H^{10}$$

In equation (a-3), D represents a sag amount which is defined as a distance from a point on the aspheric surface to a plane tangential to the aspheric surface at the optical axis; K represents a conic constant; C=1/R, where R is the paraxial radius of curvature; and $E_4$, $E_6$, $E_8$, and $E_{10}$ are aspheric coefficients.

The values of the factors in the above-described equations (a-1) to (a-3) for a numerical example 1 of the present invention are listed as follows.

Numerical Example 1:

| | R | D | Glass |
|---|---|---|---|
| 1 | 9.532 | 0.204 | FD4 |
| 2 | 4.092 | 0.848 | LAC14 |
| 3 | 51.746 | 0.025 | |
| 4 | 4.793 | 0.548 | LAC14 |
| 5 | 12.705 | D1 | |
| 6 | −29.608 | 0.132 | BACD5 |
| 7 | 0.938 | 0.695 | |
| 8 | −8.802 | 0.119 | BACD5 |
| 9 | 1.422 | 0.424 | FD110 |
| 10 | 16.002 | 0.0050 | HB |
| 11 | 3.383 | D2 | |
| STO | ∞ | 0.102 | |
| 13 | 2.767 | 0.339 | BACD5 |
| 14 | −1.357 | 0.119 | BAFD7 |
| 15 | −7.846 | D3 | |
| 16 | 4.982 | 0.005 | HB |
| 17 | 5.177 | 0.373 | BACD16 |
| 18 | −3.995 | 0.036 | |
| 19 | 1.359 | 0.390 | LAC7 |
| 20 | 336.400 | 0.119 | FD5 |
| 21 | 0.953 | D4 | |
| 22 | −17.554 | 0.305 | FC5 |
| 23 | −2.492 | 0.104 | |
| 24 | ∞ | 0.170 | BSC7 |
| 25 | ∞ | | |

The aspheric coefficients are listed as follows.

| Focal Length | D1 | D2 | D3 | D4 |
|---|---|---|---|---|
| W (f = 1.0) | 0.3060 | 4.0967 | 1.7992 | 1.5444 |
| M (f = 4.4) | 2.6370 | 1.3752 | 0.1945 | 3.1478 |
| T (f = 10) | 3.8624 | 0.5093 | 0.1657 | 3.1857 |

According to above-mentioned numerical data of the numerical example 1 of the present invention, the first, negative lens 21 and the third, positive lens 23 of the second lens group 2 are single aspheric surface lenses. The positive lens 41 of the fourth lens group 4 is also a single aspheric surface lens. When the zoom ratio of the zoom lens system is 10 times, graphic representations of the aberrations of the numerical example 1 of the present invention are shown in FIGS. 2A to 5C.

The values of the factors in the above-described equations (a-1) to (a-3) for a numerical example 2 of the present invention are listed as follows.

Numerical Example 2:

| | R | D | Glass |
|---|---|---|---|
| 1 | 8.885 | 0.204 | FD4 |
| 2 | 3.649 | 0.848 | LAC8 |
| 3 | 35.629 | 0.025 | |
| 4 | 3.849 | 0.500 | LAC14 |
| 5 | 11.405 | D1 | |
| 6 | 382.041 | 0.132 | BACD5 |
| 7 | 0.990 | 0.578 | |
| 8 | −10.493 | 0.119 | BACD5 |
| 9 | 1.504 | 0.424 | FD110 |
| 10 | 4.542 | 0.005 | HB |
| 11 | 3.211 | D2 | |
| STO | ∞ | 0.102 | |
| 13 | 2.015 | 0.339 | BACD5 |
| 14 | −1.229 | 0.119 | BAFD7 |
| 15 | −9.627 | D3 | |
| 16 | 3.284 | 0.005 | HB |
| 17 | 3.998 | 0.373 | LAC7 |
| 18 | −3.330 | 0.030 | |
| 19 | 1.365 | 0.390 | LAC7 |
| 20 | 21.050 | 0.119 | FD5 |
| 21 | 0.891 | D4 | |
| 22 | 18.038 | 0.305 | FC5 |
| 23 | −2.114 | 0.082 | |
| 24 | ∞ | 0.170 | BSC7 |
| 25 | ∞ | | |

The aspheric coefficients are listed as follows.

| Number | K | E4 | E6 | E8 | E10 |
|---|---|---|---|---|---|
| 6 | 0 | −6.49387E-03 | 1.26541E-02 | −5.49496E-03 | 9.77630E-04 |
| 11 | 0 | −6.16536E-02 | −2.16113E-02 | −4.76662E-03 | −2.38882E-02 |
| 16 | 0 | −1.46421E-02 | −7.99711E-03 | −1.55952E-03 | 1.17097E-02 |

| Number | K | E4 | E6 | E8 | E10 |
|---|---|---|---|---|---|
| 6 | 0 | −1.70167E-02 | 1.08985E-02 | −5.64082E-03 | 2.62764E-03 |
| 11 | 0 | −8.47535E-02 | −3.70359E-02 | 2.05815E-02 | 2.56339E-02 |
| 16 | 0 | −8.86099E-02 | 1.85814E-01 | −4.15798E-01 | 3.14237E-01 |

| Focal Length | D1 | D2 | D3 | D4 |
|---|---|---|---|---|
| W (f = 1.0) | 0.400 | 2.400 | 1.186 | 1.005 |
| M (f = 3.0) | 1.881 | 0.886 | 0.352 | 1.797 |
| T (f = 6.0) | 2.740 | 0.243 | 0.191 | 1.955 |

According to above-mentioned numerical data of the numerical example 2 of the present invention, the first, negative lens 21 and the third, positive lens 23 of the second lens group 2 are single aspheric surface lenses. The positive lens 41 of the fourth lens group 4 is also a single aspheric surface lens. When the zoom ratio of the zoom lens system is 6 times, graphic representations of the aberrations of the numerical example 1 of the present invention are shown in FIGS. 6A to 9C.

It is to be understood, however, that even though numerous characteristics and advantages of the present invention have been set forth in the foregoing description, together with details of the structure and function of the invention, the disclosure is illustrative only, and changes may be made in demounting, especially in matters of material, plating method and manufacturing process within the principles of the invention to the full extent indicated by the broad general meaning of the terms in which the appended claims are expressed.

What is claimed is:

1. A zoom lens system, in sequence from an object side to an image side, comprising:
   a first lens group having positive refractive power and being fixed for gathering incoming light;
   a second lens group having negative refractive power for changing a focal length of the zoom lens system;
   a third lens group having positive refractive power and being made stationary;
   a fourth lens group having positive refractive power and being movable for eliminating for an optical aberration of the zoom lens system; and
   a fifth lens group having positive refractive power and being movable for focusing purpose;
   wherein, during zooming from a wide-angle end to a telephoto end, said second and fourth lens groups are moved independently toward the third lens group in such a manner that a spacing between said first lens group and said second lens group increases and a spacing between said third lens group and said fourth lens group decreases;
   wherein, the relationship between the fourth lens group and the second lens group satisfies the following condition:

$$2.3 \leq \left|\frac{f_4}{f_2}\right| \leq 3.9$$

wherein $f_2$ and $f_4$ are focal lengths of the second lens group and the fourth lens group, respectively.

2. The zoom lens system as claimed in claim 1, wherein the second lens group comprises at least one aspheric surface.

3. The zoom lens system as claimed in claim 1, wherein the fourth lens group comprises at least one aspheric surface.

4. The zoom lens system as claimed in claim 1 satisfying the following condition:

$$0.75 \leq \frac{2 \cdot f_W \cdot f_T}{Y \cdot L} \leq 1.35$$

wherein $f_W$ and $f_T$ represent focal lengths of wide-angle end and telephoto end, respectively, Y represents a maximum diagonal length of an image plane, L represents a total length of the zoom lens system which is defined as a distance from a first lens of the first lens group to the image plane.

5. The zoom lens system as claimed in claim 1, wherein the first lens group comprises a cemented lens and a single lens, the cemented lens comprising a first lens element and a second lens element.

6. The zoom lens system as claimed in claim 5, wherein the second lens group comprises a first, negative lens, a second, negative lens, and a third, positive lens.

7. The zoom lens system as claimed in claim 6, wherein the third lens group comprises a convex lens and a concave lens.

8. The zoom lens system as claimed in claim 7, wherein the fourth lens group, in sequence from an object side to an image side, comprises two positive lenses and a negative lens.

9. The zoom lens system as claimed in claim 8, wherein the fifth lens group is a convex lens.

10. The zoom lens system as claimed in claim 9, wherein the first lens of the second lens group comprises an aspheric surface.

11. The zoom lens system as claimed in claim 10, wherein the positive lens of the second lens group comprises an aspheric surface.

12. The zoom lens system as claimed in claim 11, wherein at least one of the positive lenses of the fourth lens group comprises an aspheric surface.

13. A zoom lens system, in sequence from an object side to an image side, comprising: a first lens group having positive refractive power, a second lens group having negative refractive power, a third lens group having positive refractive power, a fourth lens group having positive refractive power and a fifth lens group having positive refractive power,
   wherein, during zooming from a wide-angle end to a telephoto end, said second and fourth lens groups are moved independently toward the third lens group in such a manner that spacing between said first lens group and said second lens group increases and spacing between said third lens group and said fourth lens group decreases, and satisfying the following condition:

$$0.75 \leq \frac{2 \cdot f_W \cdot f_T}{Y \cdot L} \leq 1.35$$

wherein $f_w$ and $f_T$ represent focal lengths of wide-angle end and telephoto end, respectively, Y represents a maximum diagonal length of the image plane, L represents a total length of the zoom lens system which is defined as a distance from a first lens of the first lens group to the image plane.

14. The zoom lens system as claimed in claim 13, wherein the second lens group comprises at least one aspheric surface.

15. The zoom lens system as claimed in claim 14, wherein the second lens group comprises a first, negative lens, a second, negative lens, and a third, positive lens.

16. The zoom lens system as claimed in claim 13, wherein the fourth lens group comprises at least one aspheric surface.

17. The zoom lens system as claimed in claim 16, wherein the fourth lens group, in sequence from an object side to an image side, comprises two positive lenses and a negative lens.

18. The zoom lens system as claimed in claim 13, wherein the first lens group comprises a cemented lens and a single lens, the cemented lens comprising a first lens element and a second lens element; and the third lens group comprises a convex lens and a concave lens.

19. The zoom lens system as claimed in claim 13, wherein the relationship between fourth lens group and the second lens group satisfies the following condition:

$$2.3 \leq \left|\frac{f_4}{f_2}\right| \leq 3.9$$

wherein $f_2$ and $f_4$ are focal lengths of the second lens group and the fourth lens group, respectively.

* * * * *